United States Patent [19]

Andersson

[11] 3,970,165
[45] July 20, 1976

[54] POWER ASSISTED STEERING SYSTEM
[75] Inventor: Per Ulf Andersson, Lidkoping, Sweden
[73] Assignee: Aktiebolaget Svenska Kullagerfabriken, Goteborg, Sweden
[22] Filed: Nov. 4, 1974
[21] Appl. No.: 520,655

[30] Foreign Application Priority Data
Nov. 2, 1973 Netherlands............................ 73.15091

[52] U.S. Cl. ............................ 180/155; 74/388 PS; 91/380; 180/159
[51] Int. Cl.² ....................................... B62D 5/08
[58] Field of Search .................. 180/79.2 R; 91/380; 74/499, 388 PS

[56] References Cited
UNITED STATES PATENTS
2,927,801  3/1960  Jackson.................... 180/79.2 R X
3,347,109  10/1967  Adams et al. .................... 74/388 PS FOREIGN PATENTS OR APPLICATIONS
1,222,182  1/1960  France ............................ 180/79.2 R Primary Examiner—M. H. Wood, Jr.
Assistant Examiner—John A. Pekar
Attorney, Agent, or Firm—Howson and Howson

[57] ABSTRACT

A power assisted steering system for a vehicle including a steering wheel operatively connected to steered wheels comprising a housing, a nut-and-screw mechanism comprising a nut member and a screw member, an input shaft mounted in said housing, at least one flexible shaft connected at one end to the steering wheel and at its opposite end to said input shaft, intermeshing gear means carried by said input shaft and one of said members of said nut-and-screw mechanism, means operatively connecting the other member of said nut-and-screw mechanism to the steerable wheels, the members of said nut-and-screw mechanism being of a configuration to preclude rotation relative to one another whereby upon rotation of one of said members, the other member is actuated in a rectilinear direction to thereby effect movement of the steered wheels, hydraulic circuit means including a double-acting servo-cylinder and a control valve including a slide member for controlling flow of hydraulic medium to and from said servo-cylinder, said servo-cylinder being operatively connected to said other member of said nut-and-screw assembly, an element journalled to permit limited movement thereof in said housing circumferentially relative to the axis of one of the members of said screw-and-nut mechanism and operatively connected to the slide member of said control valve, said input shaft journalled in said element, said slide member normally disposed in a neutral position closing flow of pressure medium to said servo-cylinder, rotation of said flexible shaft in one direction effecting rotation of said input shaft relative to said one member and circumferential displacement of said element from said neutral position to permit flow of pressure medium to said servo-cylinder.

13 Claims, 8 Drawing Figures

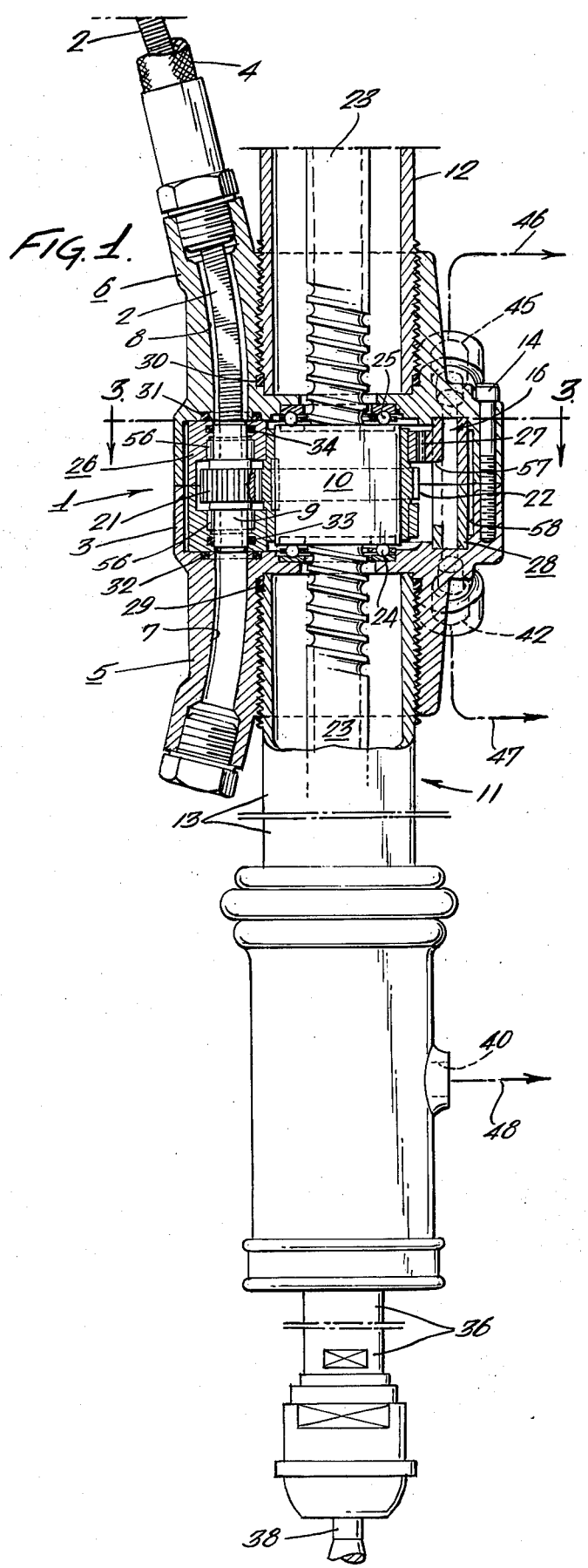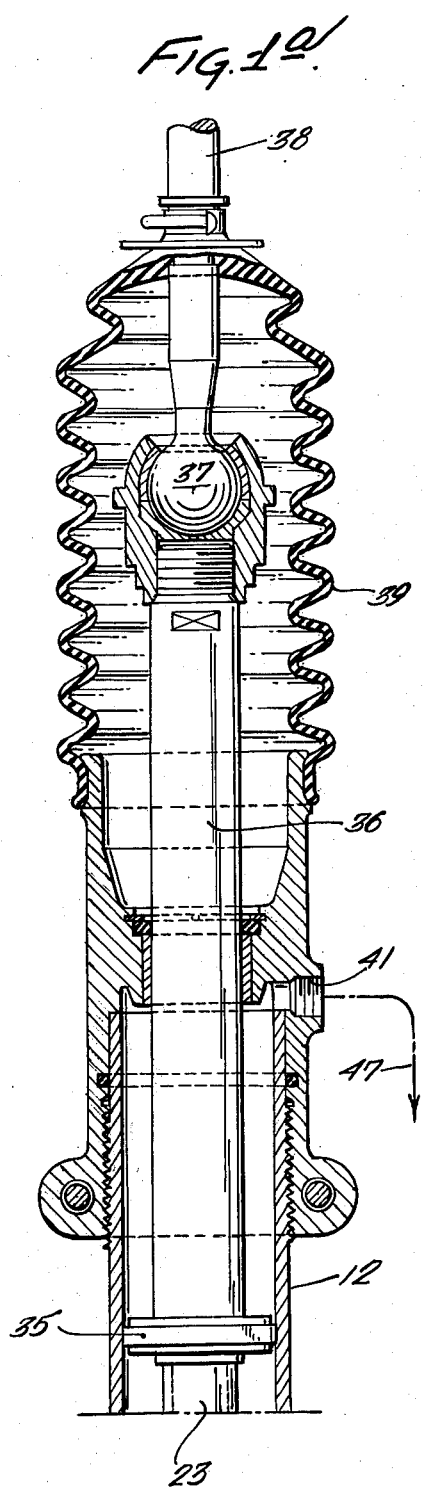

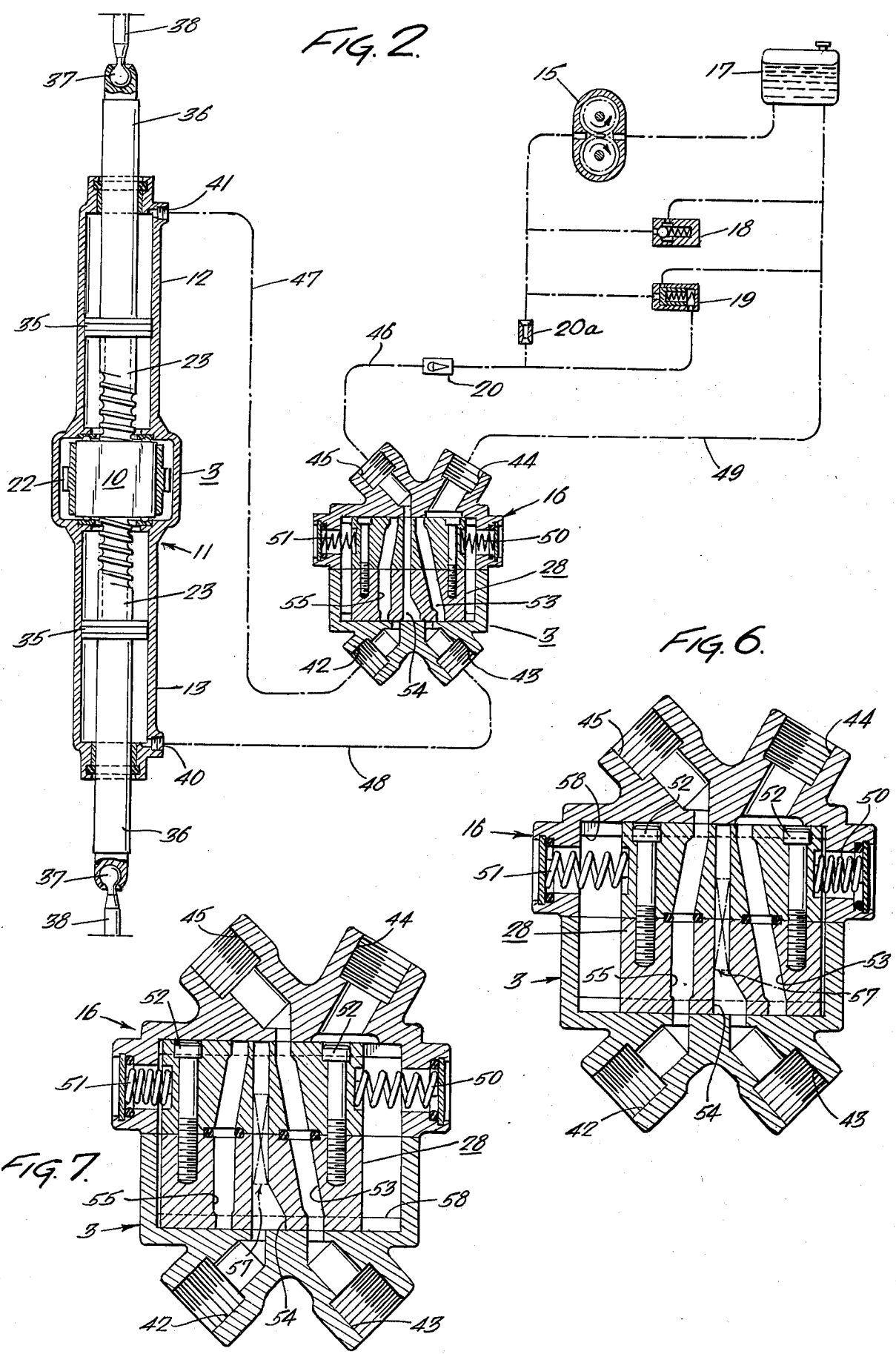

POWER ASSISTED STEERING SYSTEM

BACKGROUND OF THE INVENTION

A power assisted steering system of similar type, but having a cam and roller assembly instead of a nut and screw assembly, is known under the type-name "ZF-Gemmer Hydrolenkung". In this known steering system the input shaft is a rigid shaft capable of effecting, by means of a universal joint, a limited transverse movement upon being rotated. This transverse movement activates two or all of four discrete closing components provided in a control valve. Thus, the control valve and the means for activating it are of a rather intricate design, composed of a large number of parts.

Another power assisted steering system of similar type is described in the German published patent application No. 2,118,813 (DT-OS 2,118,813). In this known steering system is probably used a conventional rotary type control valve integral with the input shaft and activated by the torque applied to the input shaft. Also rotary type control valves are of a rather intricate design, and due to the design of the steering system high pressure seals are necessary for preventing oil of high pressure from leaking along the input shaft out of the steering gear housing.

Steering systems of the type comprising at least one flexible shaft having an input end driven by a step-up gearing and an output end driving a reduction gearing are disclosed in the French patent specification No. 2,171,815, and the present invention is specially applicable on said type of systems.

The object of the present invention is to provide a power assisted steering system, wherein the control valve and the means for operating it are of a simple design, and wherein simple low pressure seals can be used for preventing oil leakage along the input shaft.

BRIEF SUMMARY OF THE INVENTION

According to the present invention this object can be achieved by the provision of an element 26 journalled to permit limited rotation thereof around the axis of the screw and nut assembly 10 and 23, said first connecting means comprising a flexible shaft core 2 having one end located within the housing 3, said end being connected directly to the input shaft 9 and being able to perform limited substantially transverse movements, the input shaft 9 being journalled in said element 26, and said element 26 engaging a slide member 28 comprised in the control valve 16. Thus, a relatively small steering gear is obtained, comprising an antifriction nut and screw assembly, a servo valve with a slide member, and an element capable of limited rotation around the axis of the nut and screw assembly to activate the control valve. The flexible input shaft can perform limited, substantially transverse movements in the steering gear housing, while a reliable seal can be obtained with simple means. Should however, in spite of all this, oil penetrate between the flexible input shaft core and its flexible casing, this will cause no difficulties, because a closed system is formed and the presence of oil is even advantageous because it serves to lubricate the flexible shaft.

BRIEF DESCRIPTION OF THE FIGURES

The invention will be explained in detail with reference to the drawings, representing an embodiment of the invention.

FIG. 1 is a schematic representation of a number of elements forming part of a power assisted steering system according to the present invention;

FIG. 1a is a fragmentary view illustrating an extension of the apparatus of FIG. 1;

FIG. 2 is a schematic representation of the hydraulic circuit of the power assisted steering system according to the invention, said circuit comprising a double-acting servo-cylinder, a pump and a control valve with a slide member;

DETAILED DESCRIPTION OF SPECIFIC EMBODIMENT

Figure 3:
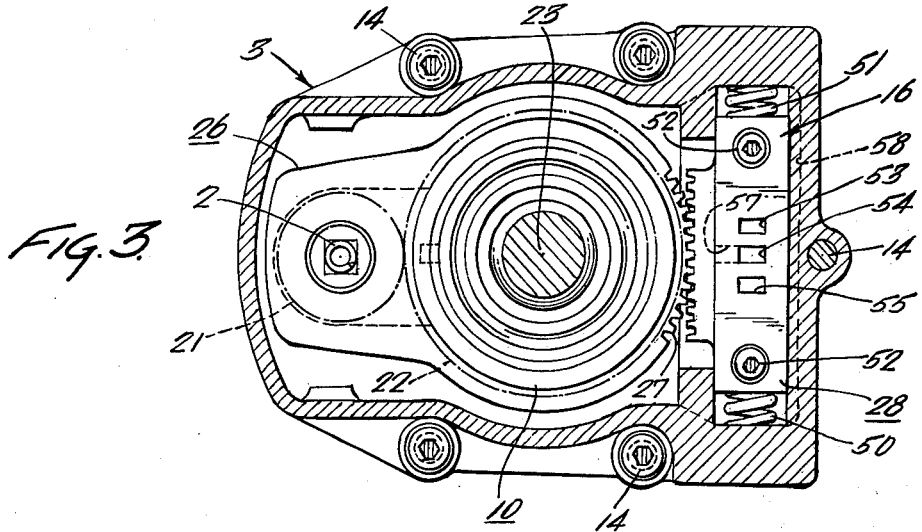
FIG. 3 is a cross-sectional view taken along line 3—3 of FIG. 1, with the in control valve slide in neutral position.

FIG. 1 gives a schematic representation of the power assisted steering system according to the present invention. The steering system comprises a mechanism for translating the rotational movement of an input shaft linked to a steering wheel into a rectilinear movement of one or more elements which, for example, modify the direction of the steered wheels of a vehicle. Further, the system is designed in such a way that the control valve of the hyraulic circuit will be activated by turning the steering wheel. The control valve controls the discharge of oil and the supply of oil to a double-acting servo-cylinder, in such a manner that the aforementioned elements will perform a rectilinear movement, thereby changing the direction of the steered wheels of the vehicle.

The steering gear unit 1 of FIG. 1 comprises a flexible input shaft 2 having a flexible shaft core, which outside a steering gear housing 3 is protected by means of a flexible casing 4. Flexible input shaft 2 is connected with the steering wheel of a vehicle. Unit 1 can also be provided with two flexible input shafts 2 as well. For this purpose steering gear housing 3 is supplied with two projecting parts 5, 6, each having a passage 7, 8 towards the interior of steering gear housing 3. Flexible input shaft 2 is linked to a rigid shaft 9, arranged as an extension of input shaft 2. In addition, steering gear unit 1 comprises a nut 10 operatively connected to a double-acting servo-cylinder 11. Said double-acting servo-cylinder 11 comprises two tubular parts 12, 13, each being screwed into the steering gear housing 3, which is split and screwed together by means of axial bolts 14. Servo-cylinder 11 is built into a hydraulic circuit, comprising a pump 15, a control valve 16, a reservoir 17, a pressure controlling valve 18, a flow controlling valve 19 mounted together with a fixed flow restrictor, and a check valve 20 (see FIG. 2).

Figure 4:
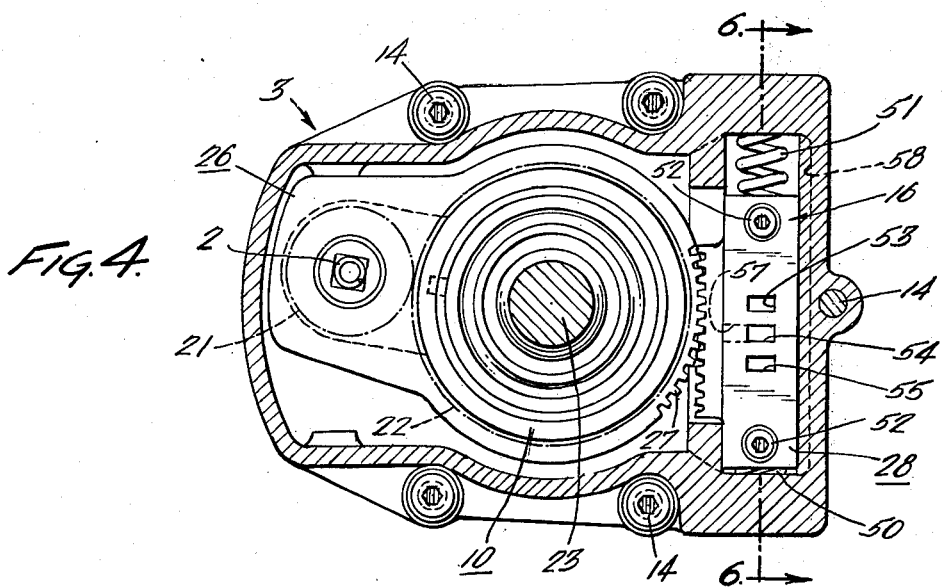
FIGS. 4 and 5 represent the same cross-section as FIG. 3, showing the control valve slide in two different positions, which differ from the neutral position as represented in FIG. 3, and FIGS. 6 and 7 are cross-sectional views taken along line 6—6 of FIG. 4 and line 7—7 of FIG. 5, respectively.
Figure 5:
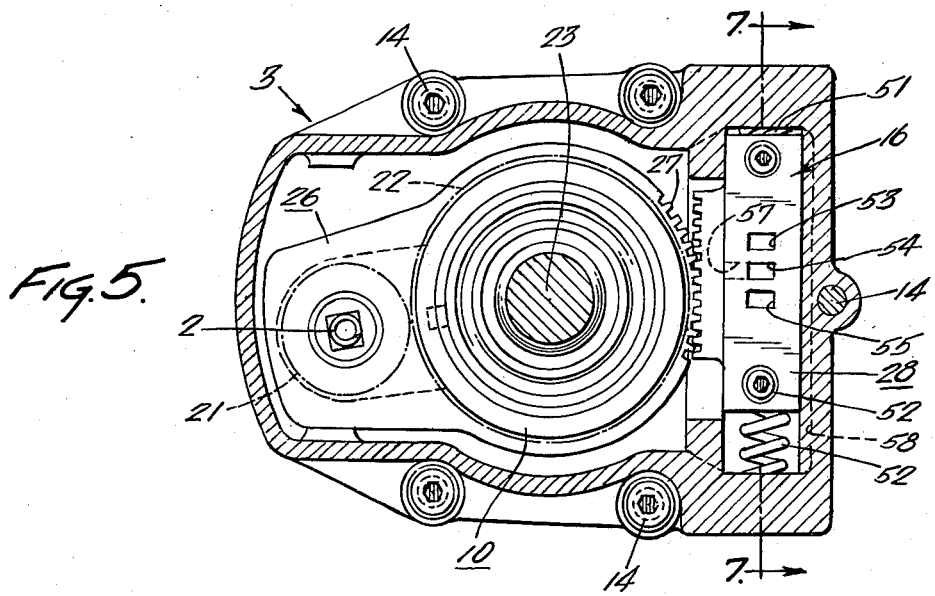

A small gear wheel 21 is mounted on or integral with rigid shaft 9 linked with flexible shaft 2, said small gear wheel meshing with external teeth 22 provided on nut 10. Nut 10 co-operates with a threaded rod 23 to form a screw and nut mechanism which translates the rotational movement of the flexible input shaft 2 into a rectilinear movement of rod 23. Nut 10, which is an antifriction nut (i.e. having balls or rollers engaging an internal thread of the nut 10 as well as the thread of rod 23) is enclosed between two thrust bearings 24, 25, preferably angular contact ball bearings. Rigid shaft 9 with gear wheel 21 is journalled in the interior of an element 26 rotatably supported by nut 10. This element can revolve around the central axis of nut 10 and, through external teeth 27 on the upper portion, engages with a toothed slide 28 of control valve 16. The range of movement of element 26 is limited by stops provided in the steering gear housing 3 as illustrated in FIGS. 4 and 5. Gear wheel 21 is journalled in element 26 by means of two needle bearings 56. Thus, flexible input shaft 2 is so supported that it can perform limited transverse movements. During such movements element 26 rotates around nut 10 in such a manner that the external teeth 27 of element 26 cause slide 28 of control valve 16 to move. The oil discharge from the double-acting servo-cylinder 11 in the hydraulic circuit and the oil supply to said cylinder 11 are controlled by means of the slide 28 of control valve 16. Preferably, the movable masses above and below the axis of the nut 10 balance each other, whereby accelerations and decelerations of the car will not affect the slide 28 and, thus, the power assistance.

Since the flexible shaft core 2, as will be clear from the following portion of the description, under ordinary driving conditions will not be subjected to any high loads, it would be possible to use a very thin core. However, in view of a possible failure of the hydraulic circuit it is recommendable to dimension the core 2 to permit steering without power assistance.

In order to prevent oil leakage, seals 29, 30 are provided between the steering gear housing 3 and servo-cylinder 11, furthermore seals 31, 32 are provided between element 26 and steering gear housing 3, at both passages 7, 8, for the flexible input shafts. No oil can flow to passages 7, 8 along needle bearings 56, 56 and between element 26 and shaft 9, since seals 33, 34 are also mounted at that side of a needle bearing facing the adjacent passage.

Oil which might penetrate into one of the passages 7, 8, will cause no great harm since the entire arrangement forms a closed system and oil can only flow between flexible shaft core 2 and its flexible casing 4, which only is advantageous in view of the wear of the flexible shaft 2. In this embodiment of the invention the rotating and translating input shaft is sealed with simple elements.

Both ends of threaded rod 23 are provided with a piston head 35. Furthermore, each end of the threaded rod 23 is linked to or integral with a piston rod 36, and each piston rod 36 is connected through a ball joint 37 to a drag link 38 serving to modify the direction of a wheel of the vehicle. Piston rods 36 and ball joints 37 are protected by bellows 39. Rotation of the threaded rod 23, of course, is prevented by suitable means (not shown), which may comprise a rounded but non-circular cross section of piston rods 36.

Servo-cylinder 11 has at both ends a threaded aperture 40, 41, for connection to pressure tubes. Steering gear housing 3 is provided with four threaded apertures 42, 43, 44, 45, two of which (42, 45) are illustrated in FIG. 1. Two of the apertures serve for connection with servo-cylinder 11, the other two for connection with the hydraulic circuit.

FIG. 2 represents the hydraulic circuit of the power assisted steering system comprising a double-acting servo-cylinder 11, a control valve 16 with a control slide 28, a pump 15, a reservoir 17 and a number of valves 18, 19, 20, and 20a including a non-return valve 20. Slide 28 is mounted in steering gear housing 3 which, as mentioned above, has four threaded apertures 42, 43, 44, and 45 for connection to pressure tubes 46, 47, 48, and 49, two leading to the servo-cylinder 11 and the other two to the hydraulic circuit. Pressure tube 47 is connected to servo-cylinder 11 at aperture 41, and pressure tube 48 at aperture 40. Tubes 47 and 48 are connected to steering gear housing 3 at apertures 42 and 43, respectively. Slide 28 is balanced in its neutral position by two oppositely acting helical springs 50, 51, and in the illustrated embodiment the slide consists of two parts which are fastened to one another by means of bolts 52. Three ducts 53, 54, 55 are formed in slide 28 for the corresponding positions thereof. FIGS. 2 and 3 show slide 28 in its neutral position. The two other positions of the slide are shown in FIGS. 4 to 7.

FIG. 3 is a sectional view of the steering gear taken along the line 3—3 of FIG. 1. Element 26 is in vertical position, thereby keeping slide 28 of control valve 16 in its neutral position. Central duct 54 is aligned with the oil supply line 46 of the hydraulic circuit.

FIGS. 4 and 5 represent the same section of the steering gear as FIG. 3, each of them illustrating the slide in a different position.

In FIG. 4 the slide is pressed against the force of spring 50 to one extreme position, while the channel 55 is aligned with oil supply line 46. In FIG. 5 the slide is pressed against the force of spring 51 to the opposite position, the duct 53 being aligned with oil supply line 46.

FIGS. 6 and 7 are cross-sectional views of the control valve taken along the line 6—6 of FIG. 4 and the line 7—7 of FIGS. 4 and 5, respectively. In FIG. 6 oil flows from oil supply line 46, connected to steering gear housing 3 at its threaded aperture 45, through duct 55 of slide 28 to oil tube 47, connected to servo cylinder 11 at its threaded aperture 41.

In FIG. 7 oil flows from oil supply line 46, through duct 53 of slide 28 to oil tube 48, connected to servo-cylinder 11 at its threaded aperture 40.

A vertical conduit 57 is provided in the slide 28 to connect continuously the central duct 54 to the interior of the steering gear housing 3, and the interior of the housing 3 is in flow communication with two end spaces wherein the two springs 50 and 51 are mounted. Slide 28 is supported by the side thereof of the steering gear housing 3, and the bottom has a central recess 58 extending from one of said end spaces to the other to provide flow communication therebetween also on the under side of the slide 28. Additionally, a conduit (not shown) is provided for permitting a permanent communication of flow between the interior of the steering gear housing 3 and the return oil outlet 44 of control valve 16.

When the steering wheel is being turned in one direction, the small gear wheel 21 on shaft 9 will "walk" about the toothed rim 22 of the nut 10 due to torsional stress arising in the flexible shaft core 2 and the force necessary for swinging the steerable road wheels. This will cause the element 26 to be turned around the axis of the nut 10, and the slide 28 will be displaced from its neutral position. Thereby, the inlet 45 for pressurized oil in the control valve 16 will be connected to one side of the double-acting cylinder 11, while the other side will be connected through the central duct 54, the vertical conduit 57, and the interior of the steering gear housing 3 to the return oil outlet 44 of control valve 16.

The pressure difference applied over the double-acting cylinder 11 gives the power assistance necessary to displace the threaded rod 23 relative the nut 10. This displacement which, as described, swings the steerable road wheels in the desired direction will, of course, cause the nut 10 to rotate, and as the nut 10 rotates the torsional stresses in the flexible shaft core 2 will decrease to zero. During the last phase of the decrease the flexible shaft core end secured to the input shaft 9 will try to assume its original neutral position and will bring with it the element 26, so that also the slide 28 will be displaced to its neutral position, thereby stopping the flow of pressurized oil to the double-acting cylinder 11 and, thus, also the power assistance. Thus, as soon as the steerable road wheels have been swung to a position corresponding to the actual turning of the steering wheel, the power assistance is reduced to zero.

While one specific embodiment of the invention has been described in detail above, it is to be understood that various modifications may be made from the specific details described without departing from the spirit and scope of the invention.

For example, the power assisted steering system described above is of open centre type, but in some cases it might be preferable to convert it into a closed centre system by closing the central duct portion located between the vertical conduit 57 and the pressurized oil inlet 45. Then, oil would flow through the control valve 16 only when power assistance is necessary. A closed centre system as a rule has its pump in common with other power assisted systems, for example, for operating the brakes and the clutch and for level control.

Further, the cross-sectional shapes of the ducts or ports have been illustrated as rectangular, but the shapes should preferably be carefully selected for each individual case to give optimum conditions at the start and termination of the power assistance. It is, of course, also possible to select another type of slide or even of control valve and to mount the valve in another position than the one described and illustrated.

Additionally, if desired, only one end of the screw member could be connected to a steering link, and it would, of course, also be possible to let the input shaft rotate the screw member in order to displace the nut along the screw. In the last case, a tubular member surrounding at least the non-driven end of the screw would be secured to the nut, and the hydraulic cylinder, which might be integral with the steering gear or, if desired, be a separate unit, would act on the tubular member.

I claim:

1. A power assisted steering system for a vehicle including a steering wheel operatively connected to steered wheels comprising a housing, a nut-and-screw mechanism mounted in said housing and comprising a nut member and a screw member, an input shaft mounted in said housing, at least one shaft connected at one end to the steering wheel and at its opposite end to said input shaft, intermeshing gear means carried by said input shaft and one of said members of said nut-and-screw mechanism, means operatively connecting the other member of said nut-and-screw mechanism to the steerable wheels, the members of said nut-and-screw mechanism being of a configuration to preclude rotation relative to one another whereby upon rotation of one of said members, the other member is actuated in a rectilinear direction to thereby effect movement of the steered wheels, hydraulic circuit means including a double-acting servo-cylinder and a control valve including a slide member for controlling flow of hydraulic medium to and from said servo-cylinder, said servo-cylinder being operatively connected to said other member of said nut-and-screw assembly, an element journalled to permit limited movement thereof in said housing circumferentially relative to the axis of one of the members of said screw-and-nut mechanism and operatively connected to the slide member of said control valve, said input shaft journalled in said element, said slide member normally disposed in a neutral position closing flow of pressure medium to said servo-cylinder, rotation of said shaft in one direction effecting rotation of said input shaft relative to said one member and circumferential displacement of said element from said neutral position to permit flow of pressure medium to said servo-cylinder.

2. A power assisted steering system as claimed in claim 1 wherein said shaft connected to the steering wheel is a flexible shaft.

3. A power assisted steering system as claimed in claim 1 wherein the movable masses above and below the axis of said nut member approximately balance each other so that acceleration and deceleration of the vehicle will not affect the displacement of the slide member.

4. A power assisted steering system as claimed in claim 1 including seal means between said element and said housing thereby blocking flow of fluid to the portion of said housing within which the flexible shaft is mounted.

5. A power assisted steering system as claimed in claim 1 including biasing means normally disposing said slide member to its neutral position.

6. A power assisted steering system as claimed in claim 1 wherein said nut member is rotatably supported in said housing by thrust bearings.

7. A power assisted steering system as claimed in claim 1 wherein said element is adapted to revolve around the longitudinal axis of said nut member and includes external teeth on a portion thereof which are in meshing engagement with teeth on said slide member whereby rotation of said element about the axis of said nut member effects displacement of said slide member from its neutral position.

8. A power assisted steering system as claimed in claim 7 including stop means in said housing engageable by said element upon rotation about the axis of said nut member thereby to limit angular displacement thereof between outer limit positions on either side of said neutral position.

9. A power assisted steering system as claimed in claim 8 wherein said element circumscribes said nut member and is adapted for rotation relative thereto whereby upon rotation of said shaft in one direction, said element is rotated circumferentially in one direction relative to said nut member to one limit position and rotation of said shaft in the opposite direction effects circumferential rotation of said element in a direction opposite said one direction to said other limit position.

10. A power assisted steering system as claimed in claim 1 wherein said double-acting servo-cylinder comprises a pair of tubular members connected to said housing and projecting in opposite axial directions from said nut member and each surrounding the opposite ends of said screw member.

11. A power assisted steering system as claimed in claim 10 wherein said screw member comprises a threaded rod, a piston head at each axial end of said threaded rod and a piston rod projecting from each piston head, each piston rod connected through a ball joint to a drag link in turn connected by suitable means to the steered wheels.

12. A power assisted steering system as claimed in claim 11 wherein said slide member housing is provided with four apertures, a first pair of said apertures being connected by lines to said servo-cylinder and a second pair of said apertures connected through lines to the hydraulic circuit.

13. A power assisted steering system as claimed in claim 12 wherein said slide member includes at least a pair of passageways, one of said passageways providing a flow path between one aperture of said first pair of apertures and one of the apertures of said second pair permitting flow of pressure medium to one of said tubular members when the slide member is in one outer limit position and the other passageway providing a flow path between the other aperture of said first pair of apertures and one of the apertures of said second pair permitting flow of pressure medium to the other tubular member when the slide member is in its opposite outer limit position.

\* \* \* \* \*